(12) United States Patent
Demoor et al.

(10) Patent No.: US 11,093,446 B2
(45) Date of Patent: Aug. 17, 2021

(54) DUPLICATE REQUEST CHECKING FOR FILE SYSTEM INTERFACES

(71) Applicant: Western Digital Technologies, Inc., San Jose, CA (US)

(72) Inventors: Thomas Demoor, Ghent (BE); Koen Struyve, Bruges (BE); Carl D'halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 175 days.

(21) Appl. No.: 16/175,948

(22) Filed: Oct. 31, 2018

(65) Prior Publication Data

US 2020/0134043 A1    Apr. 30, 2020

(51) Int. Cl.
*G06F 17/00* (2019.01)
*G06F 16/14* (2019.01)
*G06F 16/11* (2019.01)

(52) U.S. Cl.
CPC .......... *G06F 16/148* (2019.01); *G06F 16/122* (2019.01)

(58) Field of Classification Search
None
See application file for complete search history.

(56) References Cited

U.S. PATENT DOCUMENTS

| | | | | |
|---|---|---|---|---|
| 4,853,843 A | * | 8/1989 | Ecklund | ................ G06F 16/278 |
| 9,578,130 B1 | | 2/2017 | Nguyen | |
| 2002/0027567 A1 | * | 3/2002 | Niamir | ................ G06F 16/9535 |
| | | | | 715/738 |
| 2009/0116484 A1 | * | 5/2009 | Buford | ................ H04L 67/1065 |
| | | | | 370/392 |
| 2009/0204649 A1 | * | 8/2009 | Wong | ................ G06F 16/1744 |
| 2013/0339298 A1 | * | 12/2013 | Muller | .................... G06F 16/90 |
| | | | | 707/640 |
| 2014/0032566 A1 | * | 1/2014 | Agarwal | ........... G06F 16/24578 |
| | | | | 707/741 |
| 2014/0214760 A1 | * | 7/2014 | Bashyam | ................ G06F 16/27 |
| | | | | 707/613 |
| 2014/0237202 A1 | * | 8/2014 | Yamamoto | ............ G06F 3/0635 |
| | | | | 711/162 |
| 2016/0139841 A1 | * | 5/2016 | Agetsuma | ............... G06F 3/067 |
| | | | | 711/162 |
| 2017/0286439 A1 | * | 10/2017 | Nechaev | ............. H04L 67/1097 |

(Continued)

OTHER PUBLICATIONS

Amplidata N.V, a HGST company, "Himalaya | Scalable, Secure Object Storage Software."—Amplidata, amplidata.com/himalaya/features/. Accessed Oct. 30, 2018. Copyright 2008-2016.

(Continued)

*Primary Examiner* — Hasanul Mobin
(74) *Attorney, Agent, or Firm* — Patent Law Works LLP

(57) ABSTRACT

Example distributed storage systems, file system interfaces, and methods provide duplicate request checking. A file interface manages a plurality of file data requests from client systems using a file system protocol. A metadata store acts as a cross-reference between file data references and storage data references. A request data store in the metadata store includes request entries with transaction identifiers for corresponding file data requests. A duplicate checker searches the request data store and excludes incoming file data requests when it finds a matching request entry.

20 Claims, 8 Drawing Sheets

(56) References Cited

U.S. PATENT DOCUMENTS

| | | | | |
|---|---|---|---|---|
| 2017/0286717 A1* | 10/2017 | Khi | ........................ | H04W 12/10 |
| 2018/0268072 A1* | 9/2018 | Rathod | ................ | G06F 16/9535 |
| 2019/0129972 A1* | 5/2019 | Borate | ..................... | G06F 16/13 |
| 2019/0205457 A1* | 7/2019 | Koorapati | .............. | G06F 3/0652 |
| 2019/0361988 A1* | 11/2019 | Petters | .................. | G06F 16/182 |
| 2019/0394039 A1* | 12/2019 | Higo | ..................... | H04L 9/3066 |

OTHER PUBLICATIONS

Jujjuri, V., IBM Linux Technology Center, "NFS-Ganesha Why is it a better NFS server for Enterprise NAS?", Linux Collaboration Summit, 2018, slide 1-26.
Callaghan, B., et al., "NFS Version 3 Protocol Specification." IETF Tools, tools.ieff.org/html/rfc1813#section-4.5. Jun. 1995. pp. 1-126.

\* cited by examiner

DUPLICATE REQUEST CHECKING FOR FILE SYSTEM INTERFACES

TECHNICAL FIELD

The present disclosure generally relates to data storage, and in a more particular example, to distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may not include native support for object storage. As such, file system interfaces have been developed to enable systems based on alternate storage protocols, such as network file system (NFS) protocol, to benefit from storing data in a back-end large-scale storage system. In addition to object storage systems, other distributed storage systems may use storage paradigms that do not directly map to the file systems of client systems and may utilize some level of metadata and indirection to map between file data and backend storage data.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels.

In some cases, redundancy may include multiple file interface systems, client systems, and/or distributed storage systems managing file storage transactions with redundancy and various protocols for failover, reboot, retries, etc. Duplicate requests among these systems may create possible errors in some failure modes, particularly for non-idempotent requests. Non-idempotent requests may include operations that cannot be reprocessed without special attention because they may fail if repeated. For example, a CREATE request may create a file for which the owner does not have write permission, so a second request would fail if the prior request succeeded; a file removal can only succeed once; etc.

As large-scale storage systems and these file interfaces scale, reliable and efficient implementations of duplicate request handling may be needed. A need exists for at least improved duplicate request handling for file system interfaces with distributed storage systems.

SUMMARY

Various aspects for duplicate request checking, particularly, duplicate request checking by a file system interface for distributed storage systems are described.

One general aspect includes a system, including: a first file interface configured to manage a plurality of file data requests from at least one client system using a file system protocol and process the plurality of file data requests for storage in an distributed storage system; a metadata store configured to store a cross-reference of file data references and storage data references; a request data store configured to store a plurality of request entries, where a request entry in the plurality of request entries includes a transaction identifier for s corresponding file data requests; and a duplicate checker configured to search the request data store for request entries matching an incoming file data request, where the first file interface is further configured to exclude the incoming file data request from processing in response to the duplicate checker finding a matching request entry for the incoming file data request.

Implementations may include one or more of the following features. The system may further include a request cache manager configured to generate request entries responsive to receiving the incoming file data request. The system may also include the duplicate checker finding no matching request entry for the incoming file data request, where the request entry further includes a transaction status value for a non-idempotent operation and the request cache manager is further configured to update the transaction status values responsive to the first file interface processing a corresponding file data request. The system where the request cache manager is further configured to monitor a retry time limit for each request entry of the plurality of request entries and expire corresponding request entries in response to the retry time limit elapsing. The system where the first file interface is further configured to send response messages to the at least one client system responsive to processing the plurality of file data requests and receive the incoming file data request as a duplicate file data request responsive to the at least one client system not receiving a corresponding response message for an original file data request. The system where the request entry further includes a client source identifier value indicating the at least one client system from which corresponding file data requests were received. The system where the request entry include a key value entry in the metadata store and the key value entry for the request entry includes a corresponding transaction identifier. The system where the key value entry further includes a request cache identifier and an operation identifier. The system where the metadata store includes at least one key value for each file corresponding to a file data request and the request data store associates request entries with at least one key value in the metadata store. The system where each request entry includes a request key value in the metadata store corresponding to the request entry and the request key value for each request entry includes a file metadata key value for the file in the corresponding file data request. The system where the file metadata key value is a first portion of the request key value, each request entry is adjacent at least one metadata entry starting with the file metadata key value, and the duplicate checker is further configured to use the file metadata key value as an index for searching for a corresponding request key value entry. The system further including a second file interface configured to manage a plurality of file data requests from at least one client system using the file system protocol, where the metadata store is distributed in a plurality of shards. The first file interface may be associated with at least a first shard of the plurality of shards and the second file interface may be associated with at least a second shard of the plurality of shards.

One general aspect includes a computer-implemented method, including: receiving a file data request including a file identifier and a transaction identifier; searching request entries within a metadata store using the transaction identifier, where the metadata store stores a cross-reference of file identifiers and storage data references; excluding, responsive to finding a matching request entry for the transaction identifier, the file data request from processing through a file interface; and processing, responsive to not finding a matching a request entry for the transaction identifier, the file data request through the file interface. Processing the file data request further includes: storing, in the metadata store, a new request entry corresponding to the transaction identifier in the metadata store.

Implementations may include one or more of the following features. The computer-implemented method where processing the file data request further includes identifying a transaction status value for the new request entry and updating the transaction status value responsive to processing the file data request. The computer-implemented method where processing the file data request further includes monitoring a retry time limit for the new request entry and expiring the new request entry responsive to the retry time limit elapsing. The computer-implemented method where the metadata store includes at least one key value entry for the file identifier and the new request entry associates the transaction identifier with at least one key value entry for the file identifier in the metadata store. The computer-implemented method where the new request entry includes a request key value in the metadata store and the request key value includes a file metadata key value for the file identifier. The computer-implemented method where searching request entries within the metadata store uses the file metadata key value as an index for searching for a corresponding request key value.

One general aspect includes a system, including: a plurality of file interfaces configured to manage a plurality of file data requests from at least one client system using a file system protocol; means for receiving a file data request including a file identifier and a transaction identifier; means for searching request entries within a metadata store using the transaction identifier, where the metadata store stores a cross-reference of file identifiers and storage data references; and means for processing the plurality of file data requests for storage in a distributed storage system through at least one of the plurality of file interfaces, where the means for processing is configured to exclude duplicate processing responsive to finding a matching request entry for the transaction identifier and store a new request entry corresponding to the transaction identifier in the metadata store responsive to finding no matching request entry for the transaction identifier.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the handling of duplicate data operation requests received through one or more file interface systems for a distributed storage system, such as by using a request data store in the metadata store of the file interface systems. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
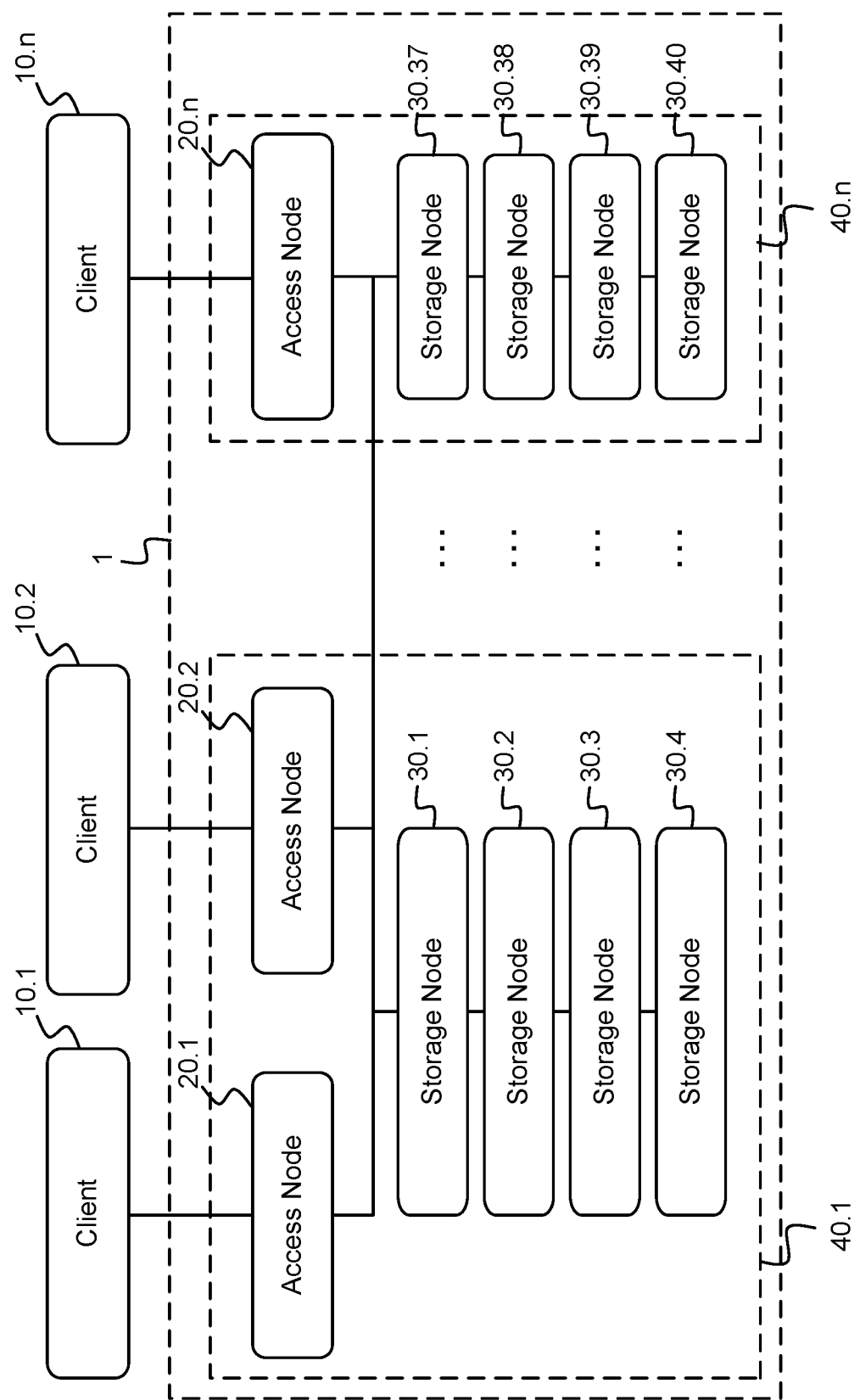
FIG. 1 schematically illustrates an example of a distributed storage system.

FIG. 1 shows an embodiment of an example distributed storage system 1. According to this embodiment the distributed storage system 1 may be implemented as a distributed object storage system which is coupled to one or more clients 10.1-10.$n$ for accessing data objects. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant, or any other type of communication device that is able to interface directly with the distributed storage system 1. However, according to alternative embodiments, the applications could, for example, comprise a suitable file system which enables a general-purpose software application to interface with the distributed storage system 1, an application programming interface (API) library for the distributed storage system 1, etc.

Clients 10 may include computing devices and/or systems running applications compatible with one or more file systems that manage data and data access through files, directories, volumes, devices, and/or similar logical structures for mapping data units to physical storage locations. For example, clients 10 may include file system clients configured with a file system protocol, such as the network file system (NFS) protocols, sever message block (SMB) protocols, file allocation table (FAT) protocols, Hadoop distributed file system (HDFS) protocols, Google file system (GFS) protocols, etc.

As further shown in FIG. 1, the distributed storage system 1 comprises a plurality of access node 20.1-20-$n$ and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers, however more frequently they are physically adapted for arrangement in large data centers, where they are arranged in modular racks 40.1-40.$n$ comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with S3 may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.$n$. Access nodes 20 may be located in the same or different racks as the storage nodes to which the access nodes connect. A rack may have multiple access nodes, for example rack 40.1, a single access node as rack 40.$n$, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
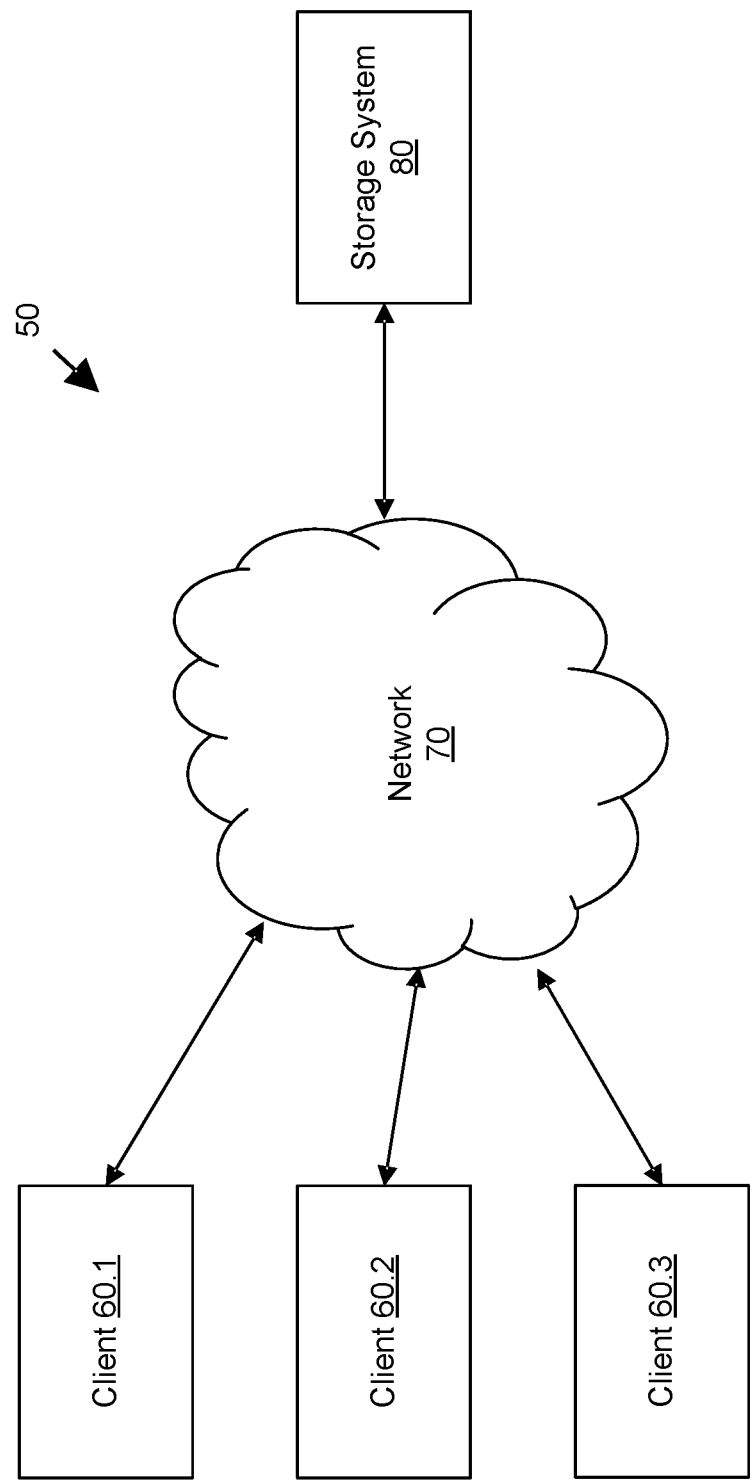
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
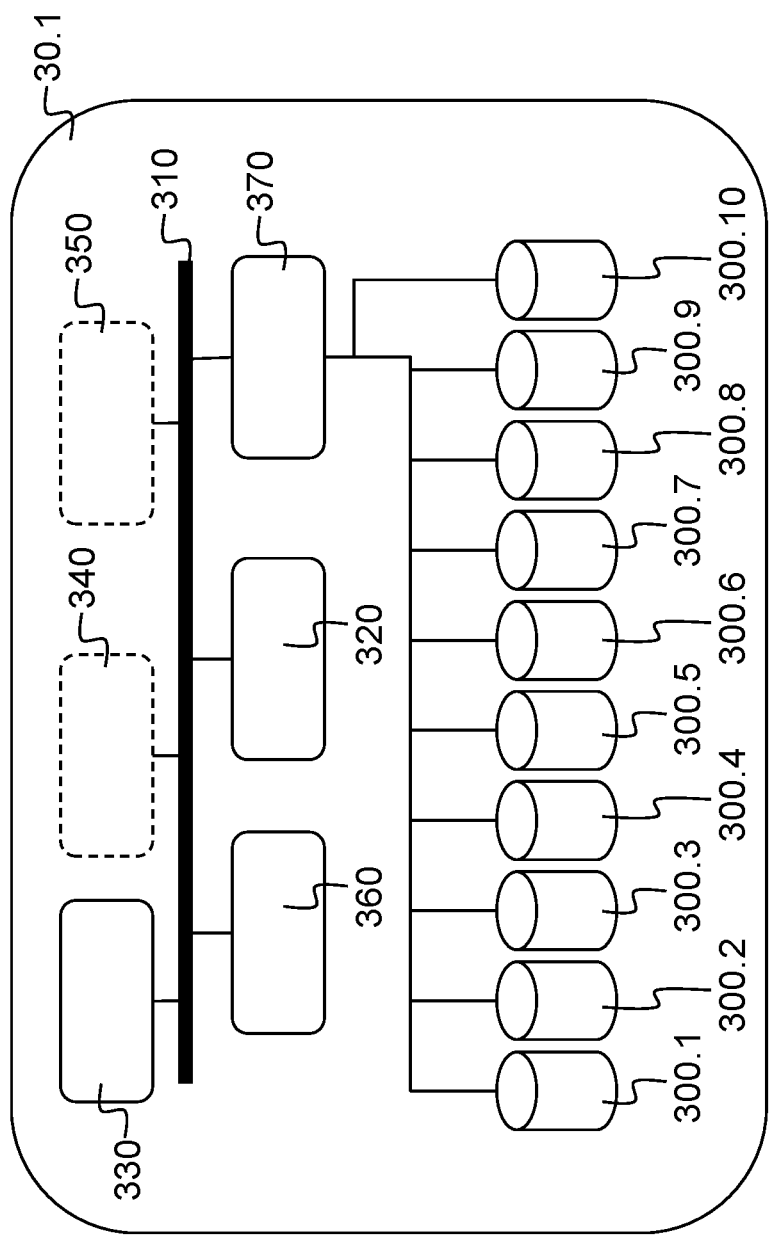
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
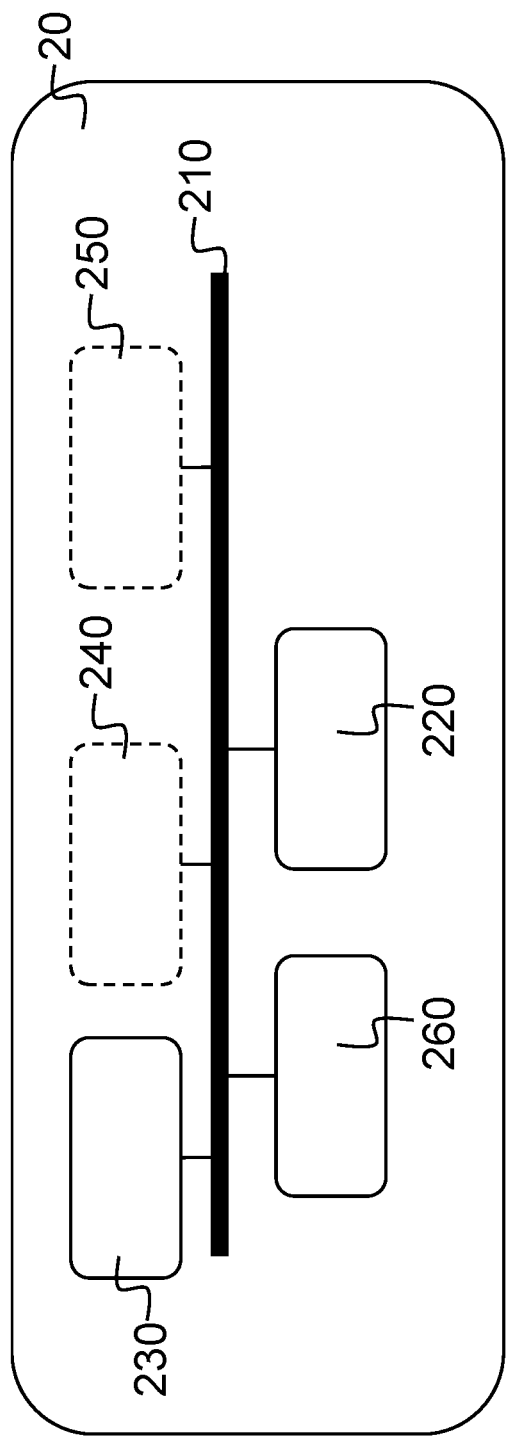
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of controller nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
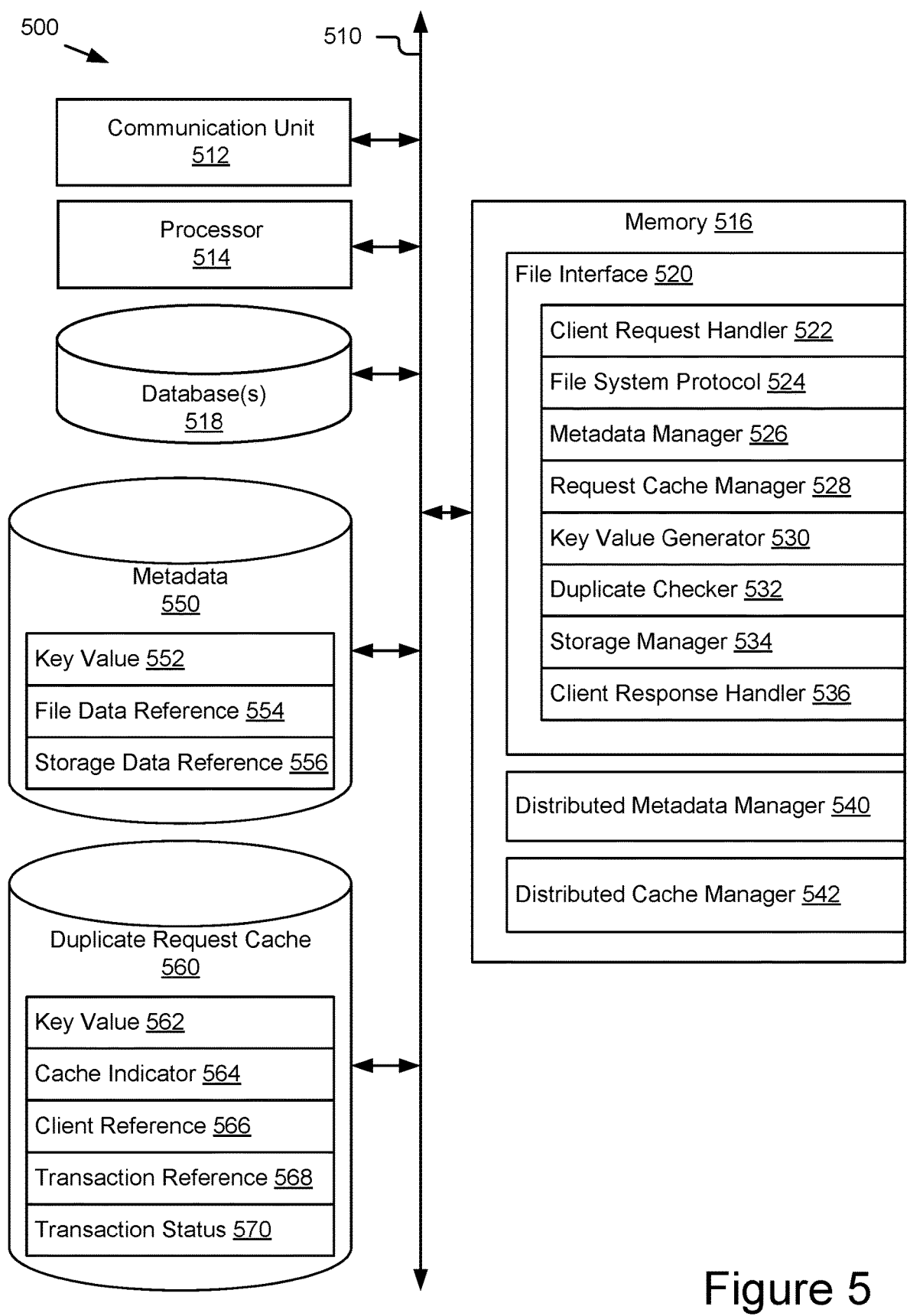
FIG. 5 schematically illustrates some example elements of a file interface system for the distributed storage system of FIG. 1.

FIG. 5 schematically shows selected modules of an access node or controller node with file system interface functions. Access system 500 may be configured as a node with an architecture and/or hardware similar to controller nodes and/or storage nodes. Access system 500 may incorporate elements and configurations similar to those shown in FIGS. 1-4. For example, access system 500 may show selected modules of access node 20 related to handling file data requests using a file system protocol.

Access system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Access system 500 may include or have access to one or more databases 518 and specialized data stores, such as metadata store 550 and duplicate request cache 560. Databases 518 may include one or more data structures for storing, retrieving, indexing, searching, filtering, etc. of structured and/or unstructured data elements. In some embodiments, duplicate request cache 560 may be integrated into metadata store 550 as key value entries and/or data fields within metadata key value entries. Metadata store 550, duplicate request cache 560, and/or other databases 518 may be maintained and managed in separate computing systems with separate communication, processor, memory, and other computing resources and accessed by access system 500 through database access protocols, such as structured query language (SQL). Metadata store 550 and duplicate request cache 560 may be structured as key-value stores and may be shared across multiple access systems 500.

Access system 500 may include a plurality of modules or subsystems that are stored and/or instantiated in memory 516 for execution by processor 514. For example, memory 516 may include a file interface module 520 configured to receive, process, and respond to file data requests from file system clients using file system protocols. File interface module 520 may be configured to receive file data requests and process the received file data requests to generate one or more storage data requests for processing by an associated distributed storage system, such as object data requests for an object storage system. File interface module 520 may communicate with metadata store 550 to store and retrieve data element cross-reference metadata to map the file system files of the requesting client to the storage data elements and/or locations of the distributed storage system.

File interface module 520 may receive duplicate file data requests from one or more file system clients. For example, system power failure, reboot, network interruptions, failover, retries due to response failure or delay, and other failures may cause a client system or systems to send duplicate requests, such as in response to not receiving a response message from file interface 520 within a specified response time. In some instances, these duplicate requests may be for non-idempotent processes that cannot be completed a second time and return the same result, causing subsequent requests to fail and/or return error messages. File interface 520 may communicate with duplicate request cache 560 to store and retrieve transaction references to prevent processing of duplicate file data requests. For example, each non-idempotent file data request may be searched in duplicate request cache 560 and only parsed for processing and logged as a new request entry in duplicate request cache 560 if no matching request entry is found.

File interface module 520 may include a client request handler 522, a file system protocol 524, a metadata manager 526, a request cache manager 528, a key value generator 530, a duplicate checker 532, an object manager, 534, and a client response handler 536. File interface module 520 may include additional modules (not shown) for other data access features, such as data caching, request prioritization, etc.

Client request handler 522 may include an interface and/or communication event-based condition for receiving file data requests from one or more file system clients. For example, client systems may send a file data request over a network connection and addressed to access system 500 or a port or component thereof. Client request handler 522 may receive these requests and parse them according to the appropriate communication and file system protocol (such as defined in file system protocol 524). For example, client request handler 522 may identify a transaction identifier, a client identifier, a file identifier, a data operation, and additional parameters for the data operation, if any, from the received message or messages that make up the file data request.

File system protocol 524 may include configuration settings, functions, modules, application protocol interfaces (APIs), extensions, or other elements to support a selected file system protocol. For example, file interface 520 may be configured to support a specific set of client systems that use a selected file system protocol, such as such as a NFS, SMB, FAT, HDFS, GFS, etc. protocol. File interface 520 may support a single file system protocol or select a protocol from a set of available protocols. In some embodiments, the other modules of file interface 520 may utilize the configuration settings or other functions of file system protocol 524 to support receiving, parsing, processing, and responding to file data requests in the selected file system protocol.

Metadata manager 526 may include an interface protocol or set of functions and parameters for storing, reading, and otherwise managing metadata related to data files and storage data elements, such as data objects. For example, metadata manager 526 may include functions for storing, searching, and reading data file to storage element mapping information to and from metadata store 550. Metadata store 550 may be configured as a key-value store. For example, each data file may have at least one corresponding entry in metadata store 550 with a unique key value 552 and a cross-reference of file data references or identifiers to storage data references or identifiers.

Each key value 552 may index a number of corresponding fields, such as file data reference 554 and storage data reference 556. File data reference 554 may provide a file data identifier, such as inode and file name, and/or parameters for generating a file data identifier corresponding to a client data file identified in a file data request in accordance with file system protocol 524. File data reference 554 may include additional file data related metadata used for managing file data requests. Storage data reference 556 may provide a data object identifier, such as a global unique identifier (GUID), and/or parameters for generating a data object identifier corresponding to client data stored in data objects in an associated object storage system and corresponding to the client data file associated with the key entry. Other storage data references may include logical and/or physical mapping for the distributed storage system, such as logical block addresses, file identifiers for a different file-based storage system, etc. In some embodiments, key value 552 may be derived from file data reference 554 and/or storage data reference 556.

Request cache manager 528 may include an interface protocol or set of functions and parameters for storing, reading, and otherwise managing request entries related to file data requests from the client systems. For example, request cache manager 528 may include functions for searching, storing, and reading request entries to and from duplicate request cache 560 or another request data store. Duplicate request cache 560 may be configured as a key-value store or entries within a key-value store, such as metadata store 550. For example, each file data request may be logged in a corresponding request entry in duplicate request cache 560 with a unique key value 562. Each file data request may include a transaction identifier from the client system for uniquely identifying file data requests. Each file data request may first be searched and compared by duplicate checker 532 to assure that the transaction identifier has not previously been received before being added to duplicate request cache 560. In some embodiments, entries in duplicate request cache 560 may also expire or be removed by request cache manager after a selected period of time, such as a maximum retry time limit of the client systems. Request cache manager 528 may monitor the retry time limit and expire corresponding request entries.

Each key value 562 may index a number of corresponding fields, such as file cache indicator 564, client reference 566, transaction reference 568, and transaction status 570. Cache indicator 564 may be used in data stores that include different types of entries, such as where duplicate request cache 560 is in the same key-value store as metadata store 550 and/or log entries for other caching (e.g. data caching) or processing activities. Cache indicator 564 may include a flag, code, or other parameter for indicating that a given entry is a request entry for duplicate request cache 560. Client reference 566 may provide a client system identifier and/or parameters for generating a client system identifier corresponding to the client source that sent a file data request in accordance with file system protocol 524. For example, client reference 566 may include the internet protocol (IP) address of the client system and the port of the client system as an example client source identifier value. Other client source identifier values may include device GUIDs, media access control (MAC) addresses, etc. Transaction reference 568 may include a unique identifier for file data requests that uniquely identifies file data request transactions whereby repeated (e.g. retry) requests would include the same unique identifier. For example, transaction reference 568 may include a transaction identifier (XID) defined by file system protocol 524 and assigned by the client system. In some embodiments, key value 562 may be derived from one or more of transaction reference 568, cache indicator 564, and client reference 566.

Transaction status 570 may provide status information regarding the processing of the transaction in the request entry. For example, a status code, string, completion flag, or other indicator may be included as a transaction status value in the request entry and updated by request cache manager 528 to indicate request status, such as received, processed, busy, response=OK, response=error, etc. Transaction status 570 may include a request receipt timestamp as an initial status indicator. Transaction status 570 may allow for multiple parameters to indicate the status of receipt, processing, and response/confirmation steps. A response indicator may include one or more parameters including or identifying the specific content of the response sent, such as a specific error message (e.g. file does not exist, etc.). These parameters may or may not be separated into independent fields in the entry. Request cache manager 528 may update transaction status 570 during various steps in the receipt, processing, and response for each file data request. Transaction status 570 may include transaction status values for non-idempotent operations that should only be processed a single time. Any subsequent duplicate requests may not impact transaction status 570.

Key value generator 530 may generate key values for a new request entry for duplicate request cache 560. Note that metadata manager 526 may also utilize a key value generator (not shown) for new mapping entries in metadata store 550 and, in some embodiments, key value generator 530 may be configured to generate both mapping entry key values and request entry key values, among others. Key value generator 530 may include logic for generating key values that improve indexing and/or reduce the number of fields to represent request entries. Key value generator 530 may parse the file data request or receive fields or parameters parsed by client request handler 522 and/or request cache manager 528 for use in generating key value 562. For example, client reference parameters, transaction identifiers, transaction types or parameters, and/or file data references may contribute to the generation of a unique key value 562 for a particular file data request.

In some embodiments, key value generator 530 may not generate a new key value and, instead, append request entry fields to an existing key value entry in metadata store 550. For example, in some configurations of duplicate request cache 560, request entries are added as a value to the key value mapping entry for the file data reference in the request. In this case, key value 562 may be the same as key value 552 for request entries and mapping entries referencing the same file data. Key value generator 530 may effectively generate key value 562 by looking up the corresponding key value 552 based on the file data reference in the file data request. Some file requests may relate to multiple file data references and corresponding file system mapping metadata. In this case, the request entry may be added to each of the multiple mapping entries in metadata store 550 for the file data reference. In some embodiments, a secondary index of the request entry values may be provided for more efficient lookups.

In some embodiments, metadata store 550 may group a plurality of write operations into a larger block for writing a data object (e.g. up to 8 1-megabyte (MB) file references into a single data object up to 8 MB) and include a single file system metadata entry for the file locations in the data object. Key value generator 530 may still generate separate key values for request entries for each of the original file data requests so that they may be tracked separately for duplicate requests.

In some embodiments, key value generator 530 may generate key value 562 based on file data request parameters to create a unique transaction value. For example, key value generator 530 may use the client reference 566, such as client IP address and port number, plus the XID and concatenate them to create a unique key value 562 for the request. Transaction type or other parameters may also be included in a unique transaction value for key value 562. This transaction-based key value may be used in a stand-alone duplicate request cache or a duplicate request cache integrated as entries alongside mapping metadata. A cache indicator 564 may be included in key value 562 to assist in locating request entries in a key-value store that includes more than one type of entry or to denote a portion of an entry as being a request entry.

In some embodiments, key value generator 530 may generate a transaction-based portion of key value 562 based on file data request parameters as described above. The corresponding key value 552 for the related file data mapping information may then be prepended to the file data request parameter portion to generate key value 562. The resulting key value with the file data mapping key plus transactional portion is unique from the file data mapping key, but may appear adjacent to the file data mapping key in metadata store 550 to cluster related information and reduce search times.

Duplicate checker 532 may respond to each file data request received by client request handler 522 and verify whether a matching transaction has already been received by access system 500. For example, when a file data request is received, duplicate checker 532 may receive or parse from the request one or more fields that may be used as an index to search for matching request entries in duplicate request cache 560. Duplicate checker 532 may receive or generate a key value using key value generator 530. The search key value may be derived from the request entry information as described above regarding key value generator 530.

Duplicate checker 532 may then use the search key value to search duplicate request cache 560 and/or metadata store 550 for a prior request entry with the same key value. If duplicate checker 532 finds no match, then the file data request may be processed as normal and a new request entry may be added using the search key value as key value 562 for the new entry. If duplicate checker 532 finds a matching request entry, the new request may be identified as a duplicate request and the incoming file data request may be excluded from processing by file interface 520. In some embodiments, transaction status 570 may govern further logic regarding whether and how any response is made to the client system regarding the file data request excluded as duplicate. For example, transaction status 570 may include or identify the response message sent for the original file data request and the response message may be resent as a response for the duplicate request.

In some embodiments, a plurality of access systems and/or plurality of client systems may generate duplicate requests received by different access systems and/or sent by different client systems. In some embodiments, duplicate request cache 560 may be an aggregate resource with request entries from all participating access systems and duplicate checker 532 may be able to conduct a single search on the aggregate duplicate request cache. In some embodiments, each access system may maintain separate duplicate request caches and duplicate checker 532 may send search queries to each request data store to search for matches. In some embodiments, metadata store 550 and/or duplicate request cache 560 may be distributed data stores that are sharded across multiple systems (as described below with regard to distributed metadata manager 540 and distributed cache manager 542). Duplicate checker 532 may use the resources and/or protocols of distributed metadata manager 540 and/or distributed cache manager 542 to identify the shard or shards corresponding to relevant segments of the data stores for searching for request entry matches.

Storage manager 534 may include an interface protocol or set of functions and parameters for storing, reading, and otherwise managing data requests to an associated distributed storage system. For example, storage manager 534 may include functions for reading, writing, modifying, or otherwise manipulating data objects and their respective client data and metadata in accordance with the protocols of an object storage system. Storage manager 534 may generate data requests translated and mapped from file data references to storage data references using metadata store 550. File interface 520 may include additional logic and other resources (not shown) for processing file data requests, such as modules for generating, caching, queueing, and otherwise managing data requests. Processing of a file data request by file interface 520 may include any number of intermediate steps that yield at least one data request to the distributed storage system from storage manager 534, such as an object data request to an object storage system.

Client response handler 536 may include an interface and/or communication logic for sending response messages, such as result, status, or error messages, to one or more file system clients related to file data requests received. For example, client response handler 536 may wait for processing to complete or generate an error and provide an appropriate result or error message to the client system(s) for each file data request received. In some embodiments, client response handler 536 may only generate responses for the first file data request of any set of duplicate requests. For example, when a duplicate request is detected by duplicate checker 532, exclusion from further processing may include exclusion of responses such that client response handler 536 may not respond to duplicate requests. In some embodiments, client response handler 536 may include logic for responding to duplicate requests with acknowledgement and/or warning messages regarding the duplicate request. For example, in response to a duplicate request, client response handler 536 may send a message identifying the transaction, noting the duplicate request, and providing status information from transaction status 570 for the original request entry.

Distributed metadata manager 540 and distributed cache manager 542 may be included in access system 500 when metadata store 550 and/or duplicate request cache 560 are distributed data stores that are distributed across multiple access systems or other computing systems. Metadata store 550 and/or duplicate request cache 560 may be sharded data stores, wherein the data stores are partitioned into segments stored in different computing systems. Distributed metadata manager 540 and distributed cache manager 542 may include the functions for locating and accessing relevant portions of the sharded data base, such as to support metadata manager 526, request cache manager 528, key value generator 530, duplicate checker 532, and storage manager 534. In some embodiments, duplicate request cache 560 comprises entries in metadata store 550 and distributed cache manager 542 may be subsumed in the function of distributed metadata manager 540.

Figure 6:
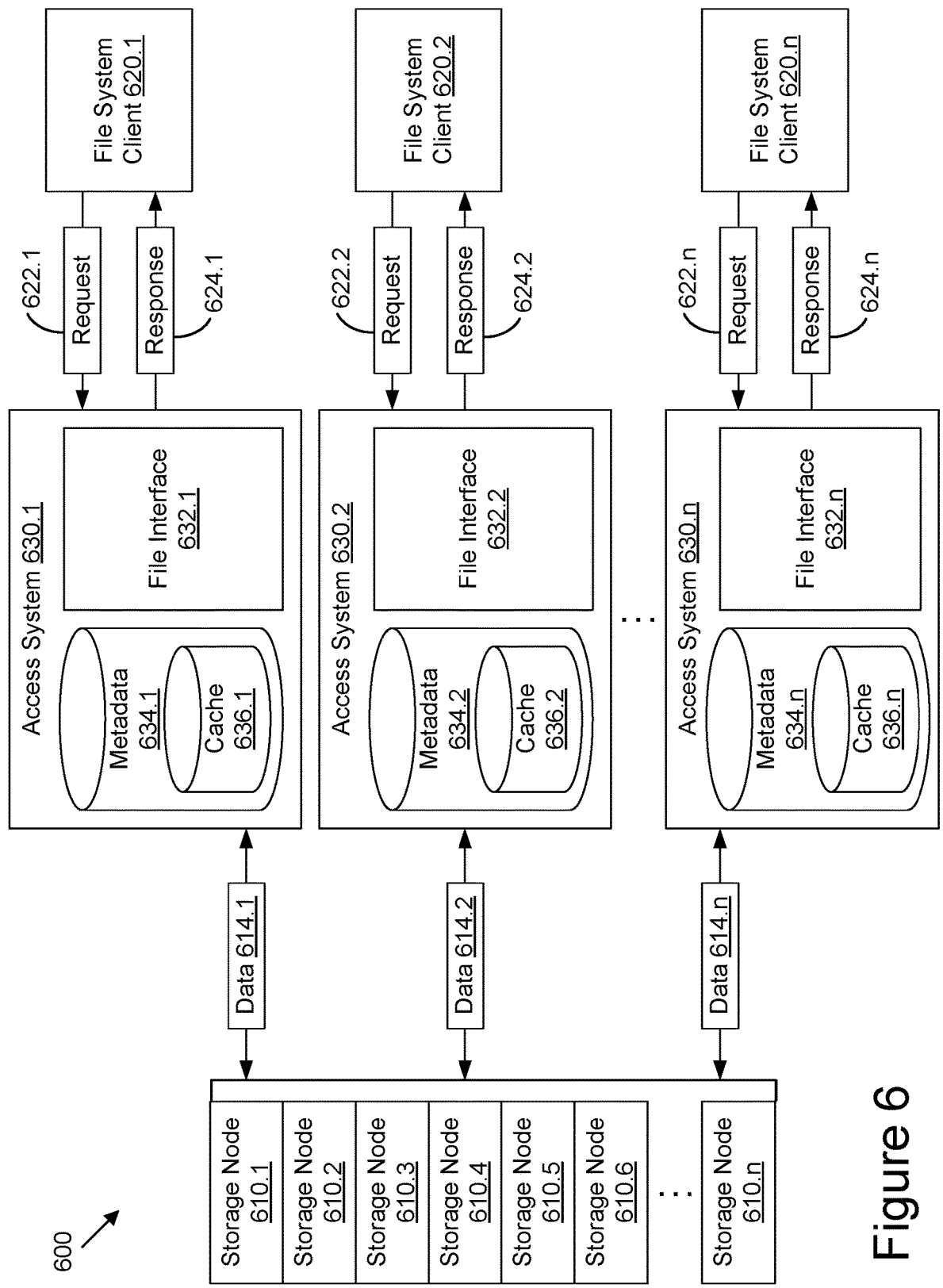
FIG. 6 schematically illustrates interactions among example file system clients, access systems, and distributed storage systems, such as the distributed storage system of FIG. 1.

FIG. 6 shows a distributed storage system 600 with duplicate request checking for file data requests from a plurality of client systems. In some embodiments, distributed storage system 600 may be configured according to the systems and elements described with regard to FIGS. 1-5. Distributed storage system 600 may include a plurality of storage nodes 610.1-610.$n$ for receiving and processing storage data requests 614.1-614.$n$. A plurality of access systems 630.1-630.$n$ may receive file data requests 622.1-622.$n$ from and provide responses 624.1-624.$n$ to file system clients 620.1-620.$n$.

File system clients 620 may include computing systems using file system protocols to access and store file data. For example, individual computing systems, application servers, legacy enterprise network systems, and other systems may be configured with NFS protocols for data storage and retrieval. File system clients 620 may host or interface with one or more applications that generate file data requests 622, such as read, write, create, delete, move, etc. requests or commands for manipulating data files through data operations. File data requests 622 may include a transaction identifier, a client identifier, a file data identifier, a data operation, and additional parameters for the data operation, if any. File system clients 620 may expect to receive responses 624 corresponding to requests 622. In some instances, failure to record or receive responses 624 may cause file system clients 620 to generate retry or duplicate file data requests, including non-idempotent file data requests that may not achieve the same result if processed more than once.

Access systems 630 may include file interfaces 632.1-632.n, metadata stores 634.1-634.n, and request caches 636.1-636.n within metadata stores 634. File interfaces 632 may include file interface systems and modules for receiving requests 622, checking for duplicate requests using request caches 636, generating data object requests 614 to storage nodes 610 for non-duplicate requests using metadata stores 634, and generating responses 624 to file system clients 620. Request cache 636.2 may be integrated into metadata stores 634 as additional database tables for request entries accessed through a common database interface with file system metadata, request entries with separate entries in tables including file system metadata, or additional fields or values for file system metadata entries.

While access systems 630 and file system clients 620 are shown in a one-to-one correlation with communication from, for example, file system client 620.1 to access system 630.1, alternate configurations may include different numbers and communication paths with regard to access systems and client systems. For example, a single access system may handle file data requests from a plurality of file system clients or a single file system client may send different file data requests to a plurality of access systems. In some configurations, a plurality of access systems 630 are configured with a plurality of file system clients 620 such that file data requests may be sent from and handled by any system for redundancy and/or requests may be dynamically load balanced across the available access systems and/or file system clients. In some embodiments, these configurations may include failover and retry of transactions across multiple file system clients 620 and/or access systems 630. Access systems 630 may be configured such that metadata stores 634 are distributed and/or accessible through remote queries from file interfaces 632 of other access systems to assure duplicate request checking across access systems and regardless of source file system client.

Figure 7:
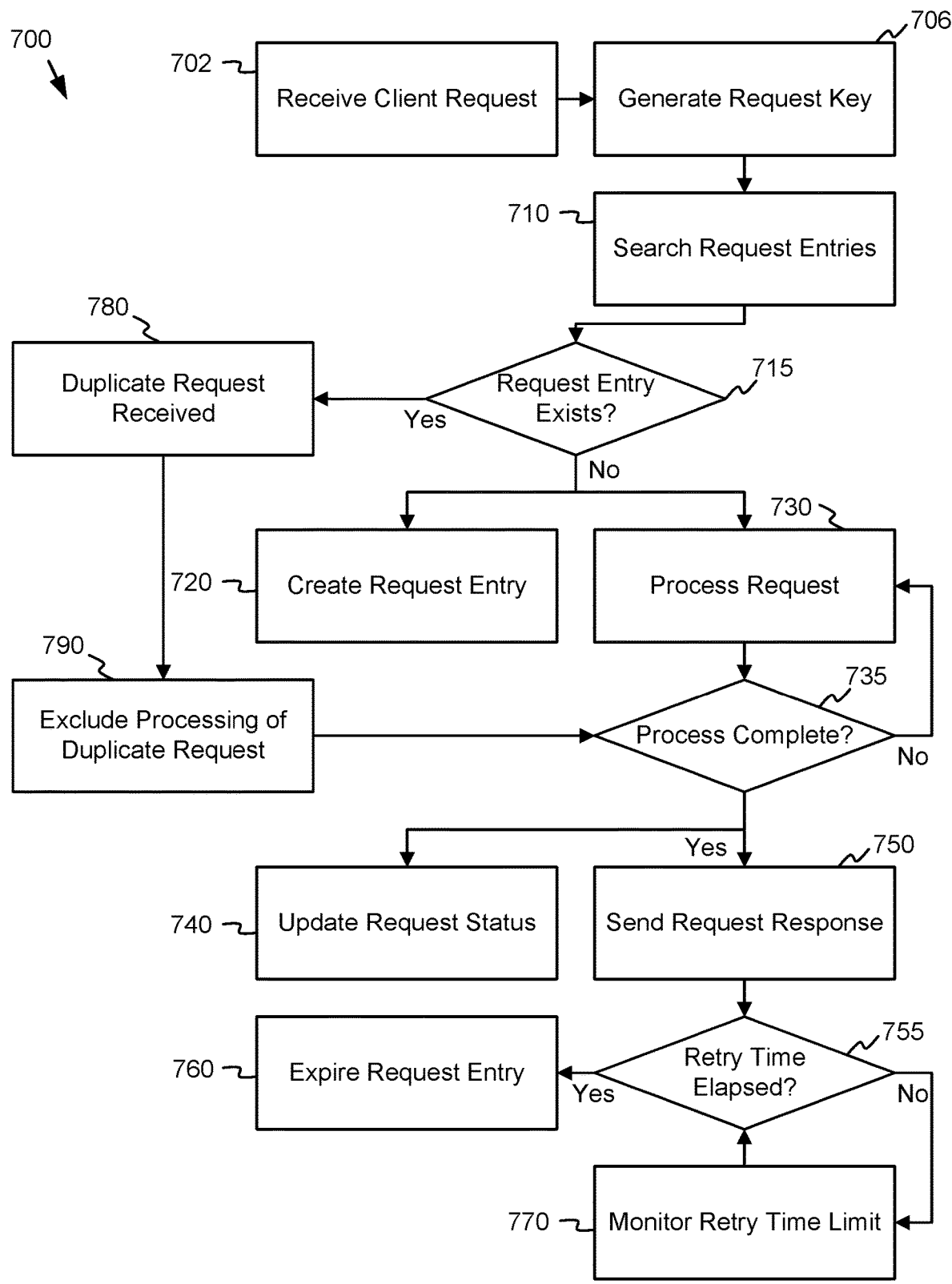
FIG. 7 illustrates an example of a method for duplicate request handling using a file system interface.

As shown in FIG. 7, the access systems 630 may be operated according to a duplicate request management method for preventing duplicate processing of non-idempotent file data requests, e.g., according to the method 700 illustrated by the blocks 702-790 of FIG. 7.

When a client application is configured to manipulate file data stored on a distributed storage system, a file data request may be received at block 702 by an access system with a file system interface. For example, a file data request with a transaction identifier and identifying a target data file and data operation in accordance with a file system protocol may be received by a client request handler.

At block 706, a request key may be generated from the file data request. For example, the file data request may be parsed according to the file system protocol to identify a transaction identifier and/or other fields that may be used to index request entries to track unique transactions.

At block 710, request entries in a request data store may be searched using the request key. For example, request data store may include key value entries in a metadata store containing file system metadata and the request key may enable search of the request entries to identify whether there is already a matching request entry for the incoming file data request.

At block 715, the access system may determine whether a matching request entry already exists in the request data store. If a matching request entry is found, method 700 may proceed to block 780. If no matching request entry is found, method 700 may proceed to blocks 720 and 730.

At block 720, a new request entry is created in the request data store for the incoming file data request. For example, a new request entry using the request key as a new key value may be added to the request data store in the metadata store. The new request entry may include an initial transaction status value, such as "busy" or "processing" and/or a receipt timestamp or serialized number for identifying specific requests (among duplicate requests).

At block 730, the file data request may be processed through one or more storage data requests to an associated distributed storage system. For example, the target data file and data operation may be converted into one or more target data objects and target object data operations and the resulting data object requests may be queued for processing by the distributed storage system.

At block 735, the access system evaluates whether processing of the file data request is complete. If processing is complete, method 700 may continue to block 740 and block 750. If processing is not complete, method 700 may return to block 730 to continue processing the file data request (and/or waiting for the related data object requests to complete processing).

At block 740, the transaction status in the request entry may be updated to reflect completion of processing and/or sending the request response. For example, when processing is complete, the transaction status value may be changed to "processed" and a response value, such as "response=OK" may be added to the request entry in the request data store.

At block 750, the response for the processed request may be sent to the client system that sent the file data request. For example, if the process completed successfully, a success message and/or data results may be returned to the client system. If the process produced an error result (unrelated to any duplicate request handling), an appropriate error message and related parameters may be returned to the client system.

At block 755, the access system may monitor the elapsed time for each request entry against a selected retry time value. For example, time from a first file data request that created a request entry and/or the most recent duplicate request may be tracked against a maximum time during which a retry could be received under the file system protocol and/or configuration of the client systems. If the retry time is elapsed, method 700 may proceed to block 760. If the retry time is not elapsed, method 700 may proceed to block 770 and continue to monitor the retry time limit.

At block 760, request entries that have passed the retry time may expire. For example, request entries older than the selected retry time may automatically be removed from the request data store to reduce the amount of space occupied by the request data store and/or reduce the required search time. In some embodiments, request entries are denoted as expired and are not searched for incoming file data requests, but may remain in the metadata store for transaction history purposes for some period of time longer than the retry time. In some embodiments, blocks 755, 760, and 770 may be executed as a separate clean-up process within the duplicate request cache and/or metadata store that may search and evaluate entries with elapsed times and remove them, such as by scanning or time-based queuing.

At block 780, a duplicate request has been received and identified by the access system. For example, a duplicate request identified by a request key matching a pre-existing request entry in the request data store may trigger a separate path for handling the duplicate request.

At block 790, duplicate processing of the data operation in the duplicate request is excluded. For example, the duplicate request may not initiate a new object data request and, instead, check whether the original process has completed at block 735. In some embodiments, a duplicate request message, optionally including the transaction status information from the corresponding request entry from the prior request, may be returned to the client system. For example, the response to the original request may be included or identified in the request entry and may be resent in response to the duplicate request. The response message may include success or a specific error (e.g. file does not exist, etc.) and may identify that it is a response to a duplicate request and/or resend of a previously sent message.

Figure 8:
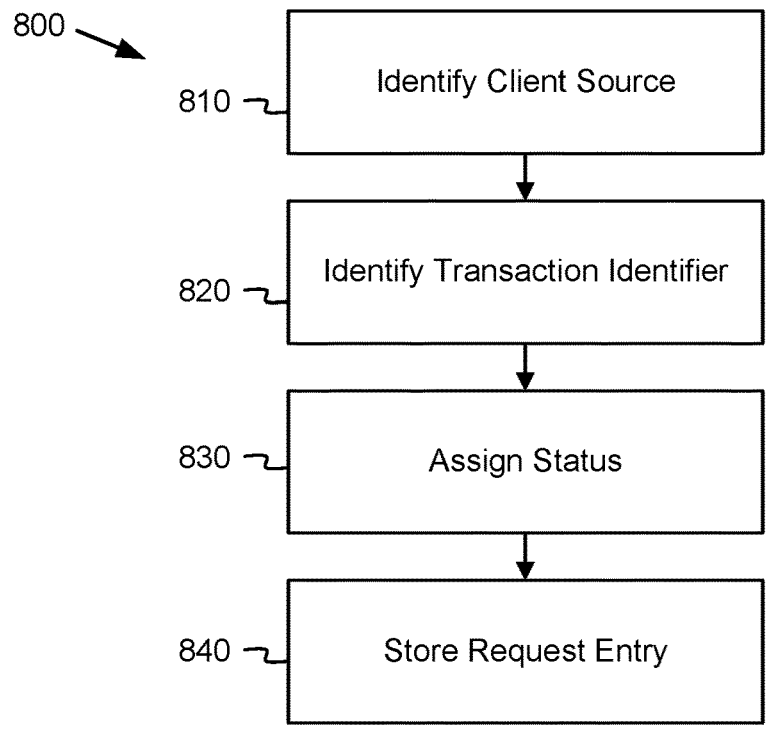
FIG. 8 further illustrates the example method of FIG. 7 with regard to creating request entries.

As shown in FIG. 8, in some embodiments, the access systems 630 may be further operated according to a request entry generation method to support preventing duplicate processing of non-idempotent file data requests, i.e. according to the method 800 illustrated by the blocks 810-840 of FIG. 8. For example, method 800 may be used for block 720 in method 700 of FIG. 7.

In response to an access system identifying an incoming file data request as a new transaction and not a duplicate request, a new request entry may be generated in the request entry data store. At block 810, a client source value or values may be identified. For example, client source references may include an address or unique identifier for the client system, such as an IP address and port, such that the client source value may be (IPADDRESS, PORT).

At block 820, a transaction identifier value or values may be identified. For example, transaction references may include an XID assigned by the client system to track unique transactions such that the transaction identifier value may be (XID).

At block 830, a transaction status value or values may be assigned for the new request entry. For example, the transaction status for an initial request may include an indicator that the file data request is being processed such that the transaction status value may be (status="busy").

At block 840, a new request entry may be stored in the request data store based on the preceding blocks. For example, a request entry with a request key value of (IPADDRESS, PORT, XID) and field value of (status="busy") may be added to the request data store within the metadata store.

Figure 9:
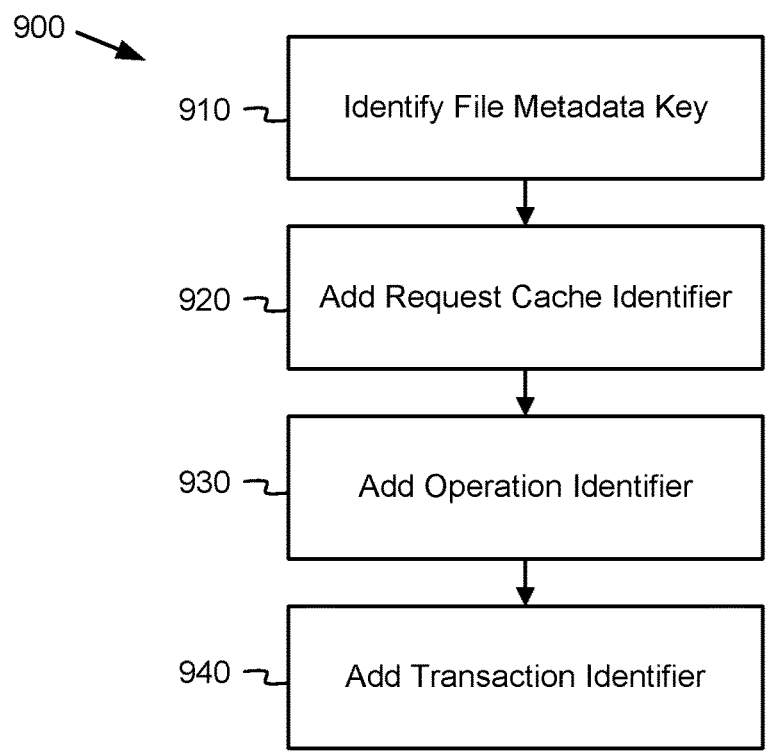
FIG. 9 further illustrates the example method of FIG. 7 with regard to creating a metadata key for request entries.

As shown in FIG. 9, in some embodiments, the access systems 630 may be further operated according to a request key generation method to support preventing duplicate processing of non-idempotent file data requests, e.g., according to the method 900 illustrated by the blocks 910-940 of FIG. 9. For example, method 900 may be used for block 706 in method 700 of FIG. 7. In some embodiments, method 900 may be combined with method 800 to generate a request key that may be used in the request entry for an incoming request that does not match an existing request entry.

In response to an access system receiving an incoming file data request, a request key may be generated to search the request entry data store. At block 910, a file metadata value or values may be identified. For example, the file data request may identify a target file with associated file system location reference, such as an inode metadata key, such that the file metadata value may be (INODE). In some embodiments, an (INODE/filename) may be used as a file metadata key value. In sharded databases, prepending with the file metadata key value may assist in locating the request entry in the same shard as the file metadata entry.

At block 920, a request cache identifier may be added to distinguish request entries from other metadata entries. For example, a request cache identifier may be a flag, code, or special character, such as "○".

At block 930, an operation identifier may be added to identify a data operation type, such as create, write, delete, set permissions, etc. For example, a system of codes designating the operation types or simplified operation names ("create", "delete", etc.) may be inserted into the request key.

At block 940, a transaction identifier may be added to uniquely identify the request entry. For example, transaction references may include an XID assigned by the client system to track unique transactions such that the transaction identifier value may be (XID). Example resulting request keys may include (INODE, "○", XID), (INODE/filename, "○", XID), or (INODE, "create", XID). In some embodiments, the request cache identifier may be followed by request value similar to the request key value in block 840 of method 800 and prepended by the file metadata value such that the resulting request key value is (INODE, "○", IPADDRESS, PORT, XID). Additional combinations of values related to the file data request and related metadata file entries may be possible and assist in indexing, searching, creating, and updating request entries in the request data store.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   a first processor;
   a first memory;
   at least one storage device;
   a first shard of a metadata store stored in the at least one storage device, wherein the metadata store includes:
      a cross-reference of file data references and storage data references; and
      a plurality of shards;
   a request data store stored in the at least one storage device, wherein:
      the request data store includes a plurality of request entries; and
      each request entry of the plurality of request entries includes a transaction identifier for a corresponding file data request; and
   a first file interface associated with the first shard of the plurality of shards, stored in the first memory, and executable by the first processor to perform first operations comprising:
      managing a plurality of file data requests from at least one client system using a file system protocol;
      processing the plurality of file data requests for storage in a distributed storage system;
      searching the request data store for a request entry that matches an incoming file data request, wherein:
         searching the request data store includes querying at least one additional shard; and
         the at least one additional shard is associated with at least one additional file interface; and
      excluding the incoming file data request from processing in response to finding a matching request entry for the incoming file data request.

2. The system of claim 1, wherein the first operations further comprise generating request entries responsive to:
   receiving the incoming file data request; and
   finding no matching request entry for the incoming file data request.

3. The system of claim 2, wherein:
   the request entry further includes a transaction status value for a non-idempotent operation; and
   the first operations further comprise updating the transaction status value responsive to the first file interface processing a corresponding file data request.

4. The system of claim 2, wherein the first operations further comprise:

monitoring a retry time limit for each request entry of the plurality of request entries; and
expiring corresponding request entries in response to the retry time limit elapsing.

5. The system of claim 1, wherein the first operations further comprise:
sending response messages to the at least one client system responsive to processing the plurality of file data requests; and
receiving the incoming file data request as a duplicate file data request, responsive to the at least one client system not receiving a corresponding response message for an original file data request.

6. The system of claim 1, wherein the request entry further includes a client source identifier value indicating the at least one client system from which corresponding file data requests were received.

7. The system of claim 1, wherein:
the request entry includes a key value entry in the metadata store; and
the key value entry for the request entry includes a corresponding transaction identifier.

8. The system of claim 7, wherein the key value entry further includes:
a request cache identifier; and
an operation identifier.

9. The system of claim 1, wherein:
the metadata store includes at least one key value for each file corresponding to a file data request; and
the request data store associates request entries with at least one key value in the metadata store.

10. The system of claim 9, wherein:
each request entry includes a request key value in the metadata store corresponding to the request entry; and
the request key value for each request entry includes a file metadata key value for the file in the corresponding file data request.

11. The system of claim 10, wherein:
the file metadata key value is a first portion of the request key value;
each request entry is adjacent at least one metadata entry starting with the file metadata key value; and
the first operations further comprise using the file metadata key value as an index for searching for a corresponding request key value entry.

12. The system of claim 1, further comprising:
a second processor;
a second memory;
a second shard of the metadata store stored in the at least one storage device, wherein the request data store is a portion of the metadata store and distributed among the plurality of shards;
a second file interface associated with the second shard, stored in the second memory, and executable by the second processor to perform second operations comprising:
managing a second plurality of file data requests from at least one client system using the file system protocol;
processing the second plurality of file data requests for storage in a distributed storage system;
searching the request data store for a second request entry that matches a second incoming file data request; and
excluding the second incoming file data request from processing in response to finding a matching request entry for the second incoming file data request.

13. A computer-implemented method, comprising:
receiving, at a first file interface of a plurality of file interfaces, a file data request, wherein the file data request includes:
a file identifier; and
a transaction identifier;
searching request entries within a plurality of shards of a metadata store using the transaction identifier, wherein:
the metadata store stores a cross-reference of file identifiers and storage data references;
the first file interface is associated with a first shard of the plurality of shards;
searching request entries includes querying at least one additional shard of the plurality of shards; and
the at least one additional shard is associated with at least one additional file interface;
excluding, responsive to finding a matching request entry for the transaction identifier, the file data request from processing through the first file interface; and
processing, responsive to not finding a matching request entry for the transaction identifier, the file data request through the first file interface, wherein processing the file data request further comprises:
storing, in the metadata store, a new request entry corresponding to the transaction identifier.

14. The computer-implemented method of claim 13, wherein processing the file data request further comprises:
identifying a transaction status value for the new request entry; and
updating the transaction status value responsive to processing the file data request.

15. The computer-implemented method of claim 13, wherein processing the file data request further comprises:
monitoring a retry time limit for the new request entry; and
expiring the new request entry responsive to the retry time limit elapsing.

16. The computer-implemented method of claim 13, wherein:
the metadata store includes at least one key value entry for the file identifier; and
the new request entry associates the transaction identifier with at least one key value entry for the file identifier in the metadata store.

17. The computer-implemented method of claim 16, wherein:
the new request entry includes a request key value in the metadata store; and
the request key value includes a file metadata key value for the file identifier.

18. The computer-implemented method of claim 17, wherein:
the file metadata key value is a first portion of the request key value;
the new request entry is adjacent at least one metadata entry starting with the file metadata key value; and
searching request entries within the metadata store uses the file metadata key value as an index for searching for a corresponding request key value.

19. A system, comprising:
a metadata store distributed in a plurality of shards stored in a plurality of storage devices; and
a plurality of access systems, wherein each access system includes:
a processor;
a memory; and a file interface stored in memory and executable by the processor to manage a plurality of file data requests from at least one client system using a file system protocol, wherein the file interface includes:
- means, stored in memory and executable by the processor, for receiving a file data request, wherein the file data request includes:
  - a file identifier; and
  - a transaction identifier;
- means, stored in memory and executable by the processor, for searching request entries within the metadata store using the transaction identifier, wherein:
  - the metadata store stores a cross-reference of file identifiers and storage data references;
  - each access system is associated with a shard of the plurality of shards; and
  - searching request entries includes querying at least one additional shard associated with a file interface of another access system from the plurality of access systems; and means, stored in memory and executable by the processor, for processing the plurality of file data requests for storage in a distributed storage system, wherein the means for processing is configured to:
- exclude duplicate processing responsive to finding a matching request entry for the transaction identifier; and
- store a new request entry corresponding to the transaction identifier in the metadata store responsive to finding no matching request entry for the transaction identifier.

20. The system of claim 19, wherein:

the new request entry includes a request key value in the metadata store;

the request key value includes a file metadata key value in the metadata store for the file identifier; and the means for searching is configured to search request entries within the metadata store using file metadata key values as an index for searching for a corresponding request key value.

* * * * *